United States Patent [19]

Kiuchi

[11] Patent Number: 4,597,045
[45] Date of Patent: Jun. 24, 1986

[54] TABULATED DATA CALCULATING APPARATUS

[75] Inventor: Hiroyoshi Kiuchi, Hachioji, Japan

[73] Assignee: Casio Computer Co. Ltd., Tokyo, Japan

[21] Appl. No.: 489,158

[22] Filed: Apr. 27, 1983

[30] Foreign Application Priority Data

Apr. 30, 1982 [JP] Japan ................................. 57-71581

[51] Int. Cl.$^4$ ............................................. G06F 15/30
[52] U.S. Cl. ..................................... 364/406; 364/900
[58] Field of Search ............... 364/406, 709, 710, 715, 364/200 MS File, 900 MS File

[56] References Cited

U.S. PATENT DOCUMENTS

| | | | |
|---|---|---|---|
| 3,610,902 | 10/1971 | Rahenkamp | 364/406 |
| 3,787,988 | 1/1974 | Nakajima et al. | 364/709 |
| 4,367,535 | 1/1983 | Matsuyama | 364/736 |

*Primary Examiner*—David H. Malzahn
*Attorney, Agent, or Firm*—Frishauf, Holtz, Goodman & Woodward

[57] ABSTRACT

In an apparatus which calculates tabulated data in at least one of lateral and vertical directions; a tabulated data totalizing and calculating apparatus comprising discriminating means to discriminate a sort of a ruled line which demarcates the tabulated data, to determine whether it is a single straight line, double line, dotted line and so on, and calculating means to perform addition, subtraction, multiplication, division and other calculations of the tabulated data in at least one of the lateral and vertical directions on the basis of information produced by the discriminating means. The apparatus includes the output means to display a result obtained by the calculating means at a predetermined position.

24 Claims, 21 Drawing Figures

| | UNIT PRICE P | NUMBER N | AMOUNT OF MONEY PE | MULTIPLYING RATE M | REAL AMOUNT OF MONEY RP |
|---|---|---|---|---|---|
| ARTICLE a | 1,500 | 5 | 7,500 | 0.8 | 6,000 |
| ARTICLE b | 700 | 10 | 7,000 | 0.9 | 6,300 |
| ARTICLE c | 1,200 | 15 | 18,000 | 0.8 | 14,400 |
| ARTICLE d | 400 | 15 | 6,000 | 0.95 | 5,700 |
| TOTAL T | 3,800 | | 38,500 | | 32,400 |

Fig. 1A

|  | UNIT PRICE P | NUMBER N | AMOUNT OF MONEY PE | MULTIPLYING RATE M | REAL AMOUNT OF MONEY RP |
|---|---|---|---|---|---|
| ARTICLE a | 1,500 | 5 | 7,500 | 0.8 | 6,000 |
| ARTICLE b | 700 | 10 | 7,000 | 0.9 | 6,300 |
| ARTICLE c | 1,200 | 15 | 18,000 | 0.8 | 14,400 |
| ARTICLE d | 400 | 15 | 6,000 | 0.95 | 5,700 |
| TOTAL T | 3,800 |  | 38,500 |  | 32,400 |

Fig. 1B

| NAME OF ARTICLE | A | B | C | D | E | F | G (TOTAL) |
|---|---|---|---|---|---|---|---|
| a1 | 10 | 8 | 4 | 3 | 2 | 6 | 33 |
| a2 | 36 | 5 | 7 | 9 | 10 | 3 | 64 |
| a3 | 20 | 10 | 9 | 8 | 7 | 6 | 60 |
| a4 | 50 | 9 | 11 | 12 | 10 | 8 | 100 |
| a (SUBTOTAL) | 110 | 32 | 31 | 32 | 29 | 23 | 257 |
| b1 | 5 | 7 | | | | | |
| b2 | 6 | 6 | | | | | |
| b (SUBTOTAL) | 11 | 13 | | | | | |
| c1 | 1 | 5 | | | | | |
| c2 | 4 | 4 | | | | | |
| c3 | 8 | 3 | | | | | |
| c (SUBTOTAL) | 13 | 12 | | | | | |
| d (GRAND TOTAL) | 134 | 57 | | | | | |

| b7 | b6 | b5 | b4 | b3 | b2 | b1 | b0 |
|----|----|----|----|----|----|----|----|
|    |    |    |    | 1  | 0  | 0  | 0  |
|    |    |    |    | 1  | 0  | 0  | 1  |
|    |    |    |    | 0  | 0  | 1  | 0  |
|    |    |    |    | 1  | 0  | 1  | 0  |
|    |    |    |    | 0  | 0  | 1  | 1  |
|    |    |    |    | 1  | 0  | 1  | 1  |
|    |    |    |    | 0  | 1  | 0  | 0  |
|    |    |    |    | 1  | 1  | 0  | 0  |
|    |    |    |    | 0  | 1  | 0  | 1  |
|    |    |    |    | 1  | 1  | 0  | 1  |
|    |    |    |    | 0  | 1  | 1  | 0  |

Fig. 3C

| α | D | X | D | X | D |
|---|---|---|---|---|---|

Fig. 3B

| α |
|---|
| D |
| D |
| D |
| D |
| GT |

TABULATED DATA CALCULATING APPARATUS

BACKGROUND OF THE INVENTION

The present invention relates to a calculation apparatus, and more particularly to a tabulated data totalizing and calculating apparatus which totalizes and calculates tabulated data arrayed in the column and row directions of a matrix.

Heretofore, the totalization of data tabulated in the shape of a matrix has been often practiced for a computer processing in sale, accounting etc. Regarding the sale, for example, sorts such as the names of articles and times such as months and weeks are dividedly listed in lateral and vertical directions, respectively, and data on the sale are totalized in the respective directions and then listed. A calculation which multiplies a certain unit price by the number of articles, namely a multiplication is conducted in a lateral and vertical direction, thereby being displayed in a particular position. Such tabulation has the feature that the monthly or annual sales of the respective articles are easy to see.

Not only in the sale and accounting mentioned above, but also in business transactions etc., the mutual relations between, e. g., various items or sections and years or months are similarly assessed, totalized or calculated by the use of matrix tables in many cases.

Methods of totalizing data tabulated in the shape of a matrix as stated above are broadly classified into two.

The first method employs a high level language such as COBOL, FORTRAN and BASIC. The user of a totalizer prepares a program conforming to a purpose, and performs tabulation and the calculations of data in vertical and lateral directions in accordance with the program.

With the second method, the user performs tabulation data vertically and laterally in accordance with formulae defined beforehand. This method is programless, but needs to define the calculations in the vertical and lateral directions.

The aforementioned methods of totalizing the data listed as the matrix have had disadvantages to be stated hereunder, respectively. With the first method, the user must prepare the program for processing, and a limited number of persons can use the apparatus. That is, only persons who can prepare the program of COBOL, FORTRAN, BASIC or the like are able to execute such totalization. Moreover, a long time and much labor are required for preparing the program.

Since the second method need not prepare the program as stated above, it seems that anybody can use the apparatus. However, the lateral and vertical calculations for totalization must be respectively defined. Eventually, in spite of the "programless method", a program must be arranged. Unlike the general high level languages, the ways of such definitions differ variously depending upon apparatuses to be used. Therefore, the user must know the way of the definitions by consulting the manual of each apparatus. Thus, it is difficult to use it easily like an avacus. Thus, this is laborious.

SUMMARY OF THE INVENTION

The present invention has been made in order to solve the problems of the prior arts described above, and has for its object to provide a tabulated data totalizing apparatus which can readily find vertical and lateral, multiplications, subtotals, mid-totals, grand totals etc. in a matrix data table without preparing a program for the totalization or calculation or defining formulae for the totalization or calculation.

The inventor has taken note of the fact that, in general, in making a table, an ordinary single line is drawn as a ruled line for dividing items, whereas a special ruled line such as a double line and a thick line is drawn as a ruled line for dividing subtotals or grand totals. Thus, in an apparatus which totalizes tabulated data in at least one of a lateral direction and a vertical direction, the present invention realizes a tabulated data totalizing apparatus in which the sorts of ruled lines for dividing tabulated data are discriminated, whereby subtotals, grand totals etc. can be found automatically merely by drawing a ruled line without setting the definitions thereof. The further feature of the present invention resides in providing the tabulated data calculating apparatus wherein a meaning of multiplication, division etc. is given to a ruled line and it becomes possible merely by drawing the ruled line to automatically perform a calculating operation and process of multiplication, division, a calculation of obtaining a percentage and so on.

BRIEF DESCRIPTION OF THE DRAWINGS

FIGS. 1A and 1B are diagrams showing examples of tabulation in an apparatus according to the present invention;

FIG. 3A is a diagram showing the relationship between the sorts of ruled lines and coded data, FIGS. 3B and 3D are data arrangement diagrams of examples of row line information, FIGS. 3C and 3E are data arrangement diagrams of examples of column line information.

PREFERRED EMBODIMENTS OF THE INVENTION

Figure 2:
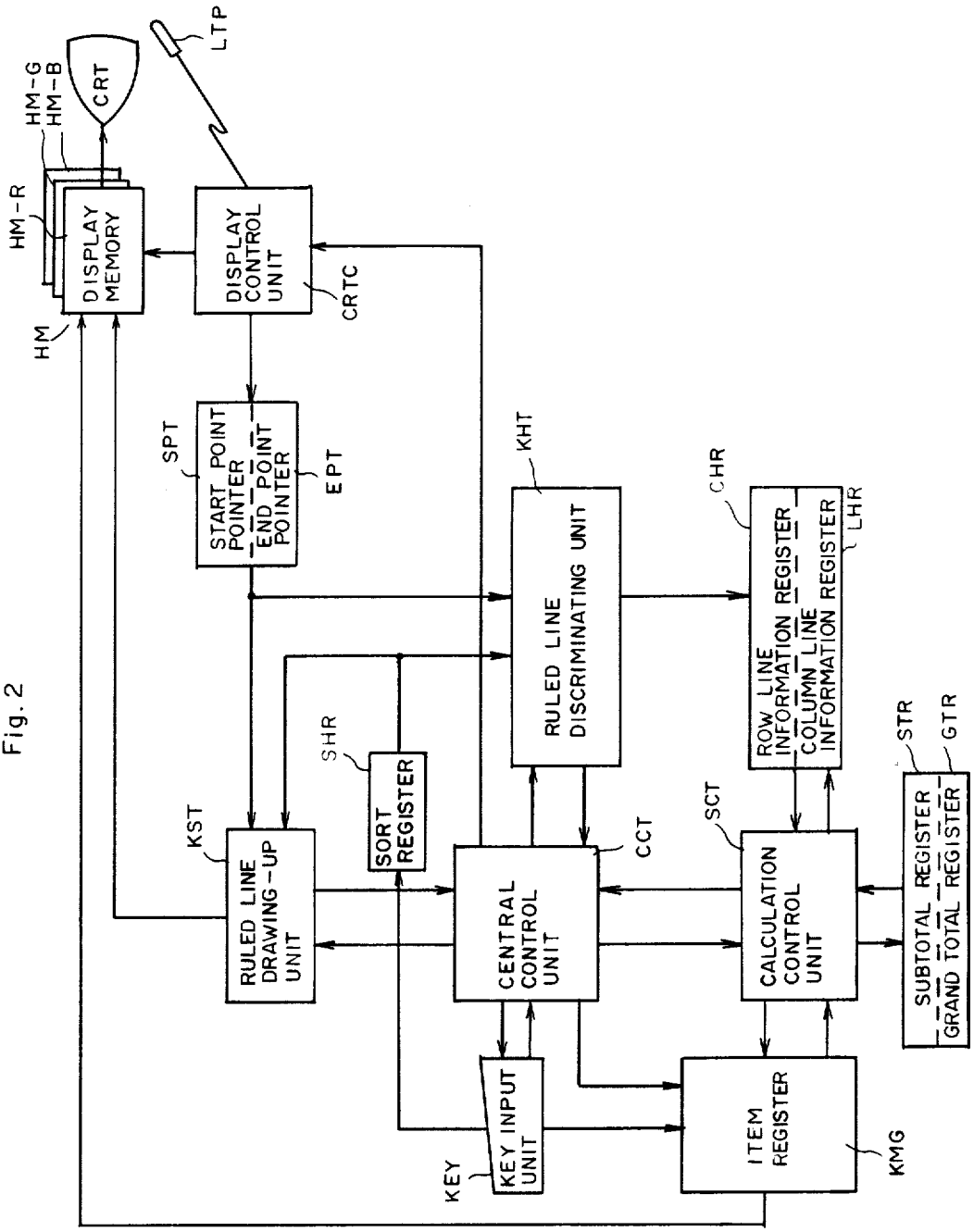
FIG. 2 is a circuit block diagram showing a first embodiment of the present invention.

The present invention will now be described in detail with reference to the drawings.

FIG. 1A shows a first example of display in a tabulated data totalizing apparatus according to the present invention. The articles a to d represent the names of the supplied articles. A unit price P shows a general unit price of the supplied article, and a number N represents the number of the supplied articles. An amount of money PE is a total amount at that time, namely the value obtained by multiplying the unit price P by the number N. With the article a, the amount of money PE is 7,500 by multiplying 1500 by 5. A multiplying rate M means a ratio to the aforementioned amount of money and a real amount of money is obtained by multiplying the amount of money PE by the multiplying rate. A ruled line lo of a single straight line merely separates those data. The ruled lines $1_1$ and $1_2$ respectively comprising a single straight line and a dot and dash line mean a multiplication in which the data immediately preceding two lines comprising the single line and the dot and dash line in a lateral and vertical direction although the lines are shown only in the lateral direction in FIG. 1A are multiplied by the data preceding the immediately preceding data by one row or column and then the result is entered into a location immediately following the two lines, namely, a right hand column or a lower row. As described above, with the ruled line $1_1$, the result obtained by multiplying the unit price P of the articles a to d by the number N is entered into the column of amount of money PE. Likewise, with the rules line $1_2$ the result obtained by multiplying the amount of money PE by the multiplying rate M is entered into the real amount of money RP. The double lines $1_3$ designates whether an immediately lower row (as shown in FIG. 1A) or an immediately right column of the double lines correspond to the subtotal or the grand total. The sum of the unit price P, amount of money PE and real amount of money RP is entered into the total row T. The total of the number N and the multiplication rate M does not have a particular meaning and the location for those total data is left blank.

FIG. 1B shows a second example of display in a tabulated data totalizing apparatus according to the present invention. The names of articles $a_1$–$a_4$, $b_1$ and $b_2$, and $c_1$–$c_3$ indicate, for example, the articles for sale. Subtotals a, b and c correspond to the total of the names of articles $a_1$–$a_4$, that of the names of articles $b_1$ and $b_2$, and that of the names of articles $c_1$–$c_3$, respectively. A grand total d is the sum of the subtotals a, b and c. Letters A–F in the uppermost row indicate divisions, for example, the days of a month, while letter G indicates the sum total of the corresponding row over the aforementioned days. A ruled line $1_{11}$ separates the various items in a matrix table vertically or laterally. A double line $1_{12}$ indicates that the lower row or right column adjoining this line denotes the totals.

The present invention executes a totalizing operation on the basis of the ruled line information. In the case of FIG. 1B, the double lines $1_{12}$ and $1_{12'}$ is detected, and an addition of the data immediately preceding the double lines in a lateral or vertical direction and the data preceding the immediately preceding data by one row or one column is conducted and the result is entered into the location immediately following the double lines. Further, the sum totals or subtotals in the row or column direction are respectively delivered to the right column or lower row adjoining these double lines $1_{12}$ and $1_{12'}$. Further, according to the present invention, in a case where the double lines lie in succession, for example, where a double line $1_{12'}$, succeeds the double line $1_{12}$ in the preceding row as illustrated in FIG. 1B, the lower row adjoining the second occurring double line denotes the grand totals.

FIG. 2 shows a first embodiment of the present invention. A central control unit CCT controls a key input unit KEY, a ruled line drawing-up unit KST, a ruled line discriminating unit KHT, a calculation control unit SCT, and an item register KMG. A key input operation is permitted by the central control unit CCT, and ruled line data is outputted from the key input unit KEY and stored in a sort register SHR. Also a command signal, which is a control signal required for drawing up a ruled line, is delivered to the central control unit CCT by the key input unit KEY. This signal is outputted when a key has been depressed by the operator of the apparatus. Using this signal, the central control unit CCT controls a display control unit CRTC.

In a case where a key for the pointer of the start point of the ruled line has been depressed, the central control unit CCT having received the key input signal controls the display control unit CRTC and causes the latter to read the pointer specified with a light pen LTP and to store the result in a start point pointer unit. Likewise, in a case where a key for the pointer of the end point of the ruled line has been depressed, the central control unit CCT controls the display control unit CRTC and causes the latter to read the pointer specified with the light pen LTP and to store the result in an end point pointer unit. Owing to the two inputs, the pointers of the start point and end point are respectively stored in the start point pointer unit SPT and end point pointer unit EPT. The results of the pointers are inputted to both the ruled line drawing-up unit KST and the ruled line discriminating unit KHT. The ruled line drawing-up unit KST connects the pointers from the pointer units SPT and EPT with ruled line data, for example, a straight line or a various double line, and stores the data in a display memory HM. Each time the tabulation between the pointers has ended, the ruled line drawing-up unit KST supplies the central control unit CCT with an end signal. The appointment of either the straight line or the double line such as the double straight lines and the two lines comprising a straight line and dot and dash line is rendered by a signal which is inputted from the sort register SHR. This signal of the sort register is also applied to the ruled line discriminating unit KHT.

The ruled line discriminating unit KHT prepares the data of row line information and column line information from the data fed from the start point pointer unit SPT and end point pointer unit EPT and the data fed from the sort register SHR, and stores them in a row line information register CHR and a column line information register LHR. Simultaneously, it delivers an end signal to the central control unit CCT. The processing steps in the ruled line drawing-up unit KST and ruled line discriminating unit KHT as described above are performed each time the start point pointer and end point pointer are assigned. In other words, they are performed a plurality of times for each of the row and column directions.

When the tabulation has been entirely completed, item data are outputted by the use of the keys of the key input unit KEY and are fed into the item register KMG under the control of the central control unit CCT. They include all the data, namely, item data corresponding to the (number of rows) × (number of columns) in a matrix formed by the tabulation. In some cases, however, unnecessary numerical data etc. are not inputted. At substantially the same time that the item data have been stored in the item register KMG, they are stored in the display memory HM. The display memory includes memories HM-R, HM-G, HM-B respectively corresponding to three colors of red, green and blue and has a function of displaying a plurality of colors.

Upon receiving a control start signal sent from the central control unit CCT, the calculation control unit SCT reads out correspondingly the data stored in the item register KMG and the row line information and column line information stored in the row line information register CHR and column line information register LHR, thereby performing a necessary calculation.

When the calculation is relating to a subtotal or grand total, it finds the totals in the column and row directions by the use of a subtotal register STR and a grand total register GTR. The results are stored in the item register KMG and also the display memory HM in single row unit and single column unit. When the totalizing and calculating operation has been entirely completed, an end signal is delivered from the calculation control unit SCT to the central control unit CCT. In performing the total finding operation, an address register built in the totalization control unit SCT is used.

A display unit CRT displays the data stored in the display memory HM, and is also used for detecting the position specified with the light pen LTP. The display and detection are controlled by the display control unit CRTC.

FIG. 3A represents an example of 8 bit data showing a line sort in a sort register SHR. The bits $b_6$ to $b_4$ represent a color display of the line and a red, green and blue corresponds to the respective bit. In the embodiment of the present invention, each bit has two values and is possible to display seven colors including a white color. The bits $b_3$ to $b_0$ represent a shape of the line. If the data is "1000" ("10" shows a binary number), a single straight line is represented. The bit data "1001" shows two straight lines, "0010" a dotted line, "1010" two lines comprising a straight line and dotted line, "0011" a dotted and dashed line, "1011" a double line comprising a straight line and a dotted and dashed line, "0100" a two dot and dash line, "1100" a double line comprising a straight line and a two dot and dash line, "0101" a wave curved line, "1101" a double line comprising a straight line and a wave curved line, and "0110" a thick line, respectively. These data are produced from the key input portion KEY and stored in the sort register SHR by a unit of every 8 bit.

FIG. 3B and 3C represent the resultant data obtained through processing from the row line information register CHR and the column line information register LHR in the display example of the present invention shown in FIG. 1A. $\alpha$ represents a character data, D a numeric value data, X a result data obtained from a multiplication, and GT a total data. The data corresponding to the symbol $\alpha$, D, X, and GT are converted into code data and are stored in the row line information register CHR and column line information register LHR.

Figure 3D:
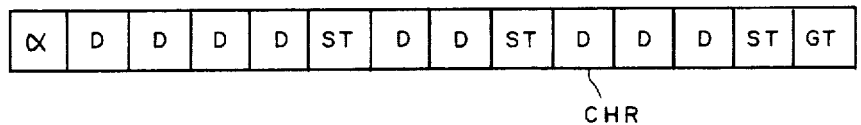
Figure 3E:
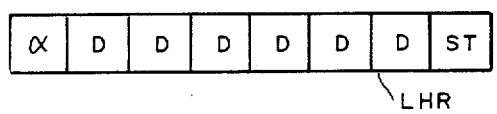
Figure 3F:
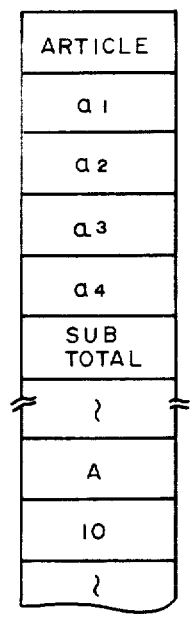
FIG. 3F is a data arrangement diagram of an example of information of an item register.

FIGS. 3D, 3E and 3F show the data of the respective processed results of the row line information register CHR, column line information register LHR and item register KMG in the example of display of the apparatus of the present invention as shown in FIG. 1B. Symbol $\alpha$ in FIGS. 3D and 3E denotes character data, symbol D numerical data, symbol ST subtotal data, and symbol GT grand total data and the corresponding symbols in a column and row direction are encoded and stored in the row line data register CHR and the column line data register LHR.

Before the item data are inputted, there are only the numerical data D, multiplication data X, subtotal data ST and grand total data GT, and no character data $\alpha$ is assigned. The reason is that only the results of the operations of inputting the ruled lines have been received, with no item data received. In other words, only the numerical data D, the multiplication data X and the subtotal data ST as well as the grand total data GT can be discriminated from the ruled lines $1_0$, $1_1$, $1_2$, $1_3$, $1_{11}$, $1_{12}$ and $1_{12'}$ in FIGS. 1A and 1B, and the numerical data D and the character data $\alpha$ cannot be discriminated therefrom.

The character data $\alpha$ can be discriminated when the item register KMG has been supplied with the item data shown in FIG. 3F, and the numerical data D are converted into character data at this time. In a case where no character data has been inputted, all the item data become numerical data which are the objects of the totalization.

Figure 3G:
FIG. 3G is a data arrangement diagram showing another example of row line information.

FIG. 3G shows another example of storage of the row line information (and the column line information have a similar construction thereto). Ruled line data K are inserted in the row line information. The character data or the numerical data is included in a position sandwiched between one ruled line data K and another ruled line data K. In this case, the subtotal data ST is handled similarly to the ruled line data. As shown in FIG. 3G by way of example, the subtotal data ST exists between the numerical data D so as to indicate that the next item is the subtotal.

Figure 4:
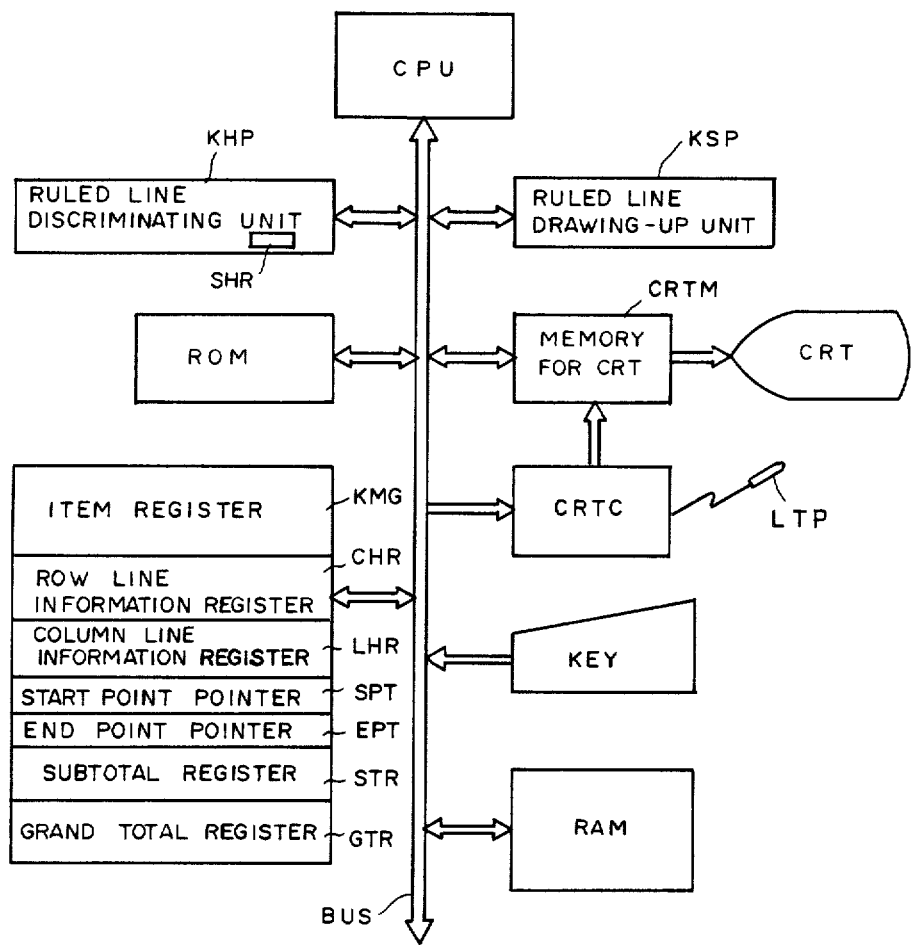
FIG. 4 is a circuit block diagram of a second embodiment of the present invention which employs a processor.

FIG. 4 shows a second embodiment of the present invention. Herein, although operations similar to those of the first embodiment are performed, the processing steps are conducted by a processor CPU.

A ruled line discriminating unit KHP and a ruled line drawing-up unit KSP are constructed of memories which store therein programs for executing the respective processing steps, namely, the ruled line discriminating processing and the ruled line drawing-up processing. The sort register SHR is provided within the ruled line discriminating portion KHP.

A read only memory ROM stores therein processing programs (for totalization, etc.) other than the ruled line drawing-up processing and the ruled line discriminating processing, and further processing programs which are not directly pertinent to the present invention.

A memory for display CRTM stores therein data to be indicated on a display unit CRT and has a memory of storing three colors of a red, green and blue. A display control unit CRTC processes data afforded with a light pen LTP, and controls the display memory CRTM.

A key input unit KEY is an input device with which the operator of the apparatus inputs control commands and item data, and which has input keys. A random access memory RAM is used as working areas for executing various processing steps. For example, the stack area of the processor CPU is also allotted to the memory RAM.

An item register KMG, row line information register CHR, column line information register LHR, start point pointer unit SPT, end point pointer unit EPT, subtotal register STR, and grand total register GTR correspond to the respective registers of the first embodiment of the present invention described before, and they are constructed of a random access memory. The aforementioned ruled line discriminating unit KHP, ruled line drawing-up unit KSP, memory ROM, display memory CRTM, display control unit CRTC, key input unit KEY, memory RAM, and registers KMG, CHR, LHR, SPT, EPT, STR and GTR are connected to the bus line BUS of the processor CPU.

The second embodiment of the present invention shown in FIG. 4 performs the same processing as that of the first embodiment of the present invention shown in FIG. 2.

FIG. 5, FIG. 6, FIG. 7 and FIGS. 8A–8D show the flows of the processing steps in the first and second embodiments of the present invention.

Figure 5:
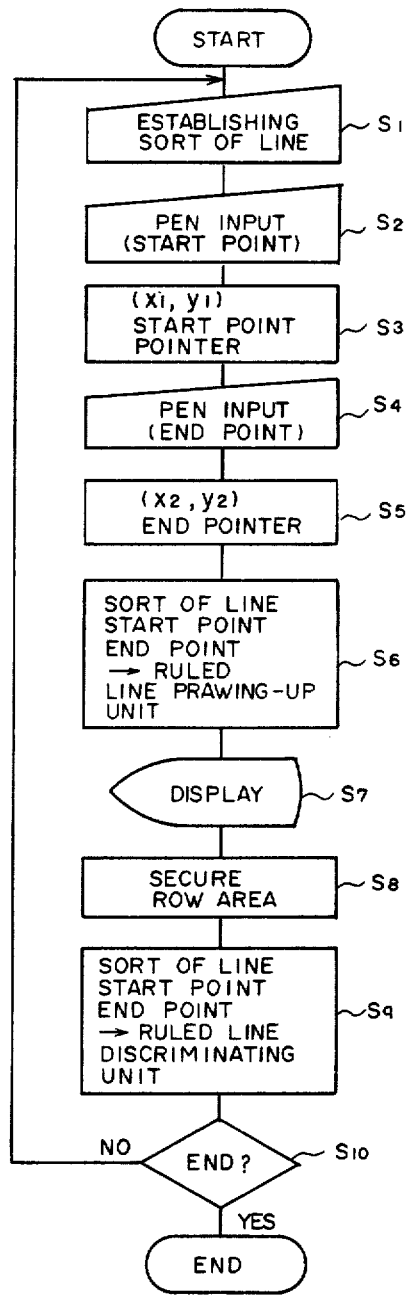
FIG. 5, FIG. 6, FIG. 7, FIGS. 8A to 8D and FIG. 9 are processing flow charts of the embodiments of the present invention.

FIG. 5 illustrates the processing flow of specifying a row line and preparing row line information. The sort of the row line, namely, the sort of the ruled line is inputted from the key input unit KEY and is set ($S_1$). Next, the start point of the ruled line is inputted ($S_2$) with the light pen LTP, and a start point pointer ($x_1$, $y_1$) is determined ($S_3$). The result is stored ($S_3$) in the start point pointer SPT. Likewise, the end point is inputted ($S_4$) with the light pen LTP, and an end point pointer ($x_2$, $y_2$) is determined ($S_5$). Now that the sort of the ruled line and the respective pointers ($x_1$, $y_1$) and ($x_2$, $y_2$) of the start and end points of the ruled line have been determined, the ruled line drawingup unit KSP is caused to run ($S_6$), and the resulting data are displayed ($S_7$) on the display unit CRT. Subsequently, the row area of item data is secured ($S_8$). This step $S_8$ is the processing of securing the place of use in the item register KMG as corresponds to row No. This processing is not necessary when row No. is determined in advance. Next, likewise to the run ($S_6$) of the ruled line drawingup unit, the ruled line discriminating unit KHP is caused to run ($S_9$) by the use of the data of the sort of the ruled line and the respective pointers ($x_1$, $y_1$) and ($x_2$, $y_2$) of the start and end points of the ruled line, so as to find row line information and to store the data in the row line information register CHR. This processing is repeated that number of times which is equal to the number of corresponding rows. Whether or not the processing ends, is decided at an end deciding step ($S_{10}$). When the processing of FIG. 5 thus far described has ended, the row line information as shown in FIGS. 3D and 3C are stored in the row line information register CHR.

Column line information are obtained similarly to the processing flow of FIG. 5 described above. At the end of the processing of the column line information, the column line information as shown in FIGS. 3B and 3E are stored in the column line information register LHR. Further, a matrix table is displayed on the display unit CRT.

Figure 6:
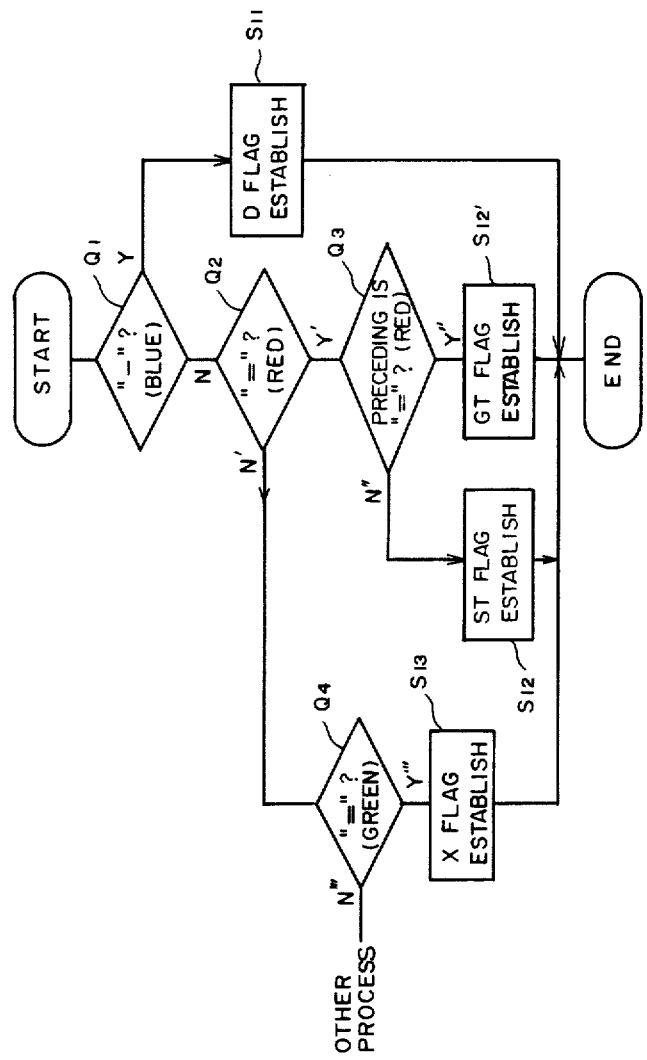

FIG. 6 shows more in detail, the run ($S_9$) of the ruled line discrimination KHP in the above-stated processing flow of FIG. 5.

First, whether or not the ruled line is a single straight line is discriminated ($Q_1$). In the case (Y) of the single straight line, it is decided that the ruled line specifies numerical or character data, and the numerical data D are stored or established ($S_{11}$) in the row line information register CHR (the column line information register LHR as regards the column line information processing). In the case (N) where the ruled line is not the single straight line, it is subsequently discriminated ($Q_2$) if the ruled line is a double straight line. In the case (N') where the ruled line is not the double straight line, it is determined if the ruled line is a double line comprising a straight line and a dot and dash line. In the case (Y''') where the ruled line comprises a double line of a straight line and a dot and dash line, the multiplication data X is stored ($S_{13}$) in the column line data register LHR when the column line data is processed. In the case (N''') where the ruled line is not the double line comprising a straight line and a dot and dash line, another processing such as error processing for an input mistake is executed. In the case (Y') of the double straight line, whether or not the preceding ruled line was a double straight line is discriminated ($Q_3$). In the case (N'') where the preceding ruled line was not the double straight line, subtotal data ST is stored ($S_{12}$) in the row line information register CHR (the column line information register LHR as regards the column line information processing), and in the case (Y'') where the preceding ruled line was the double straight line, grand total data GT is stored ($S_{12'}$) in the same. Then, the processing ends. The aforementioned multiplication data X, numerical data D, subtotal data ST and grand total data GT are flags which indicate whether the item data of positions corresponding to the respective ruled lines are multiplication, numerical value, subtotal or grand total. In other words, the processing steps ($S_{11}$, $S_{12}$, $S_{12'}$, $S_{13}$) signify setting the respective flags X, D, ST and GT in those parts of the row line information register which correspond to the respective item data. The discriminations $Q_1$, $Q_2$, $Q_3$ and $Q_4$ of the ruled line are relating to a shape of the line but if the sort of the ruled line is separated by the color as shown in a bracket in FIG. 6, a color discrimination is conducted.

Figure 7:
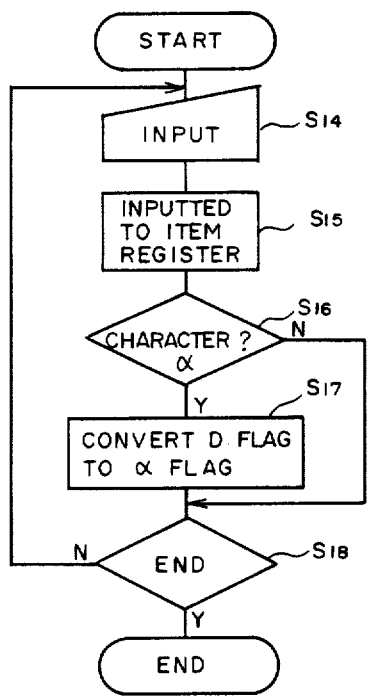

FIG. 7 shows the processing flow of item data inputs. This processing is executed after the processing of displaying the row lines and preparing the row line information and the processing of displaying the column lines and preparing the column line information, explained with reference to FIG. 5, have ended.

First, item data is inputted ($S_{14}$) from the key input unit. Next, the data is inputted ($S_{15}$) to the item register. Further, whether or not the data is an αcharacter, namely, character data is decided ($S_{16}$). In the case (Y) of the character data in the decision ($S_{16}$), numerical data D in the corresponding position of the row information register CHR or column information register LHR is rewritten into the character data α ($S_{17}$). That is, a D flag is turned into an α flag. In the case (N) where the data is not the character data, it is the numerical data, and hence, the rewriting processing step ($S_{17}$) is jumped. That is, the flow shifts to the next processing without executing the rewriting processing step ($S_{17}$).

Subsequently, it is decided ($S_{18}$) if the processing of the item data ends. In the case (Y) where the processing ends, inputting is ended, and in the case (N) where it does not end, the flow returns to the inputting step ($S_{14}$) again and item data is inputted. The above processing is repeated until all item data have been inputted. In the input processing, some items do not require item data. In such case, blank data or zero data and so on is inputted.

FIGS. 8A to 8D show the processing flow in the calculation control portion SCT of the first embodiment and a calculation processing program of a processor of the second embodiment. When all the item data have been inputted, this processing is executed. The mark

FIGS. 8A to 8D means that the execution is transferred to the terminal n.

Figure 8A:
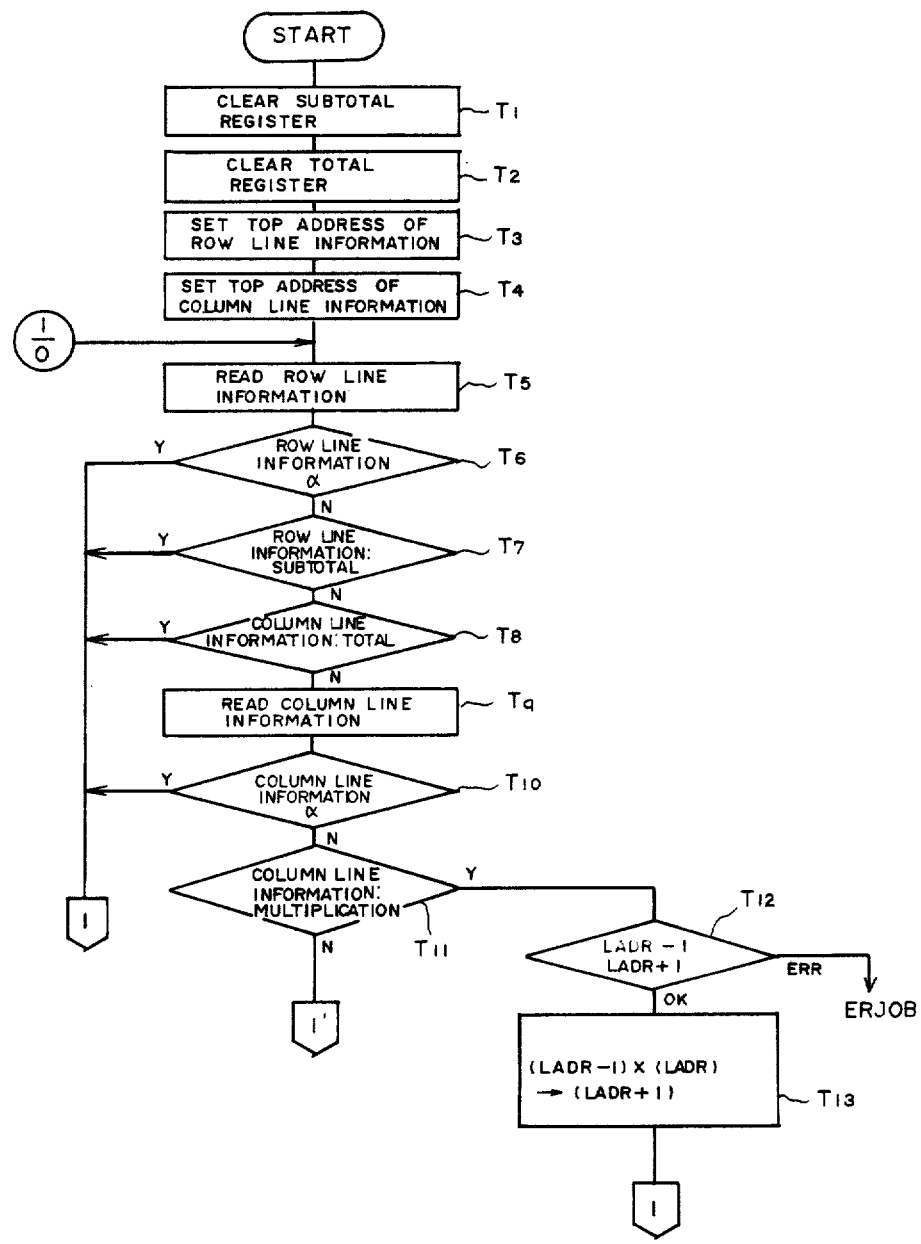
Figure 8B:
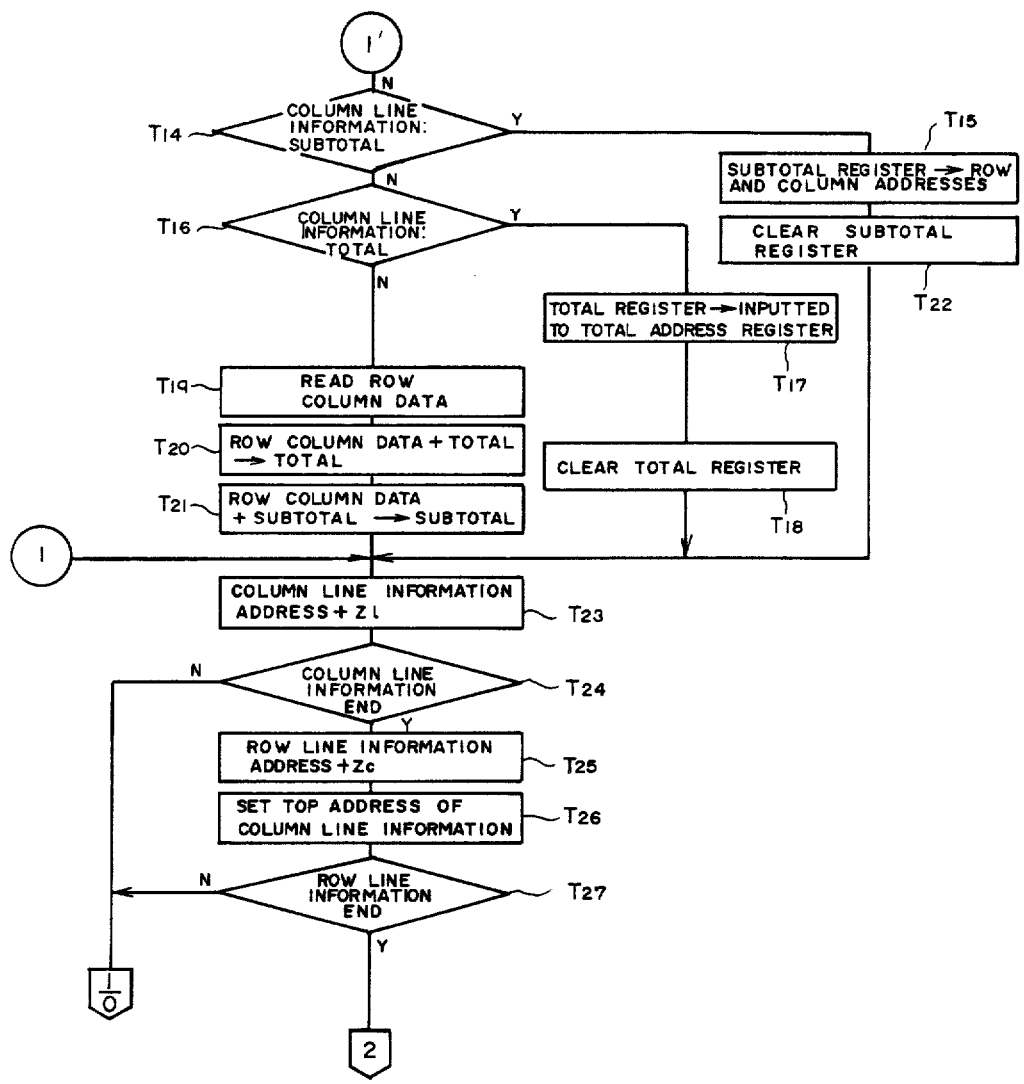
Figure 8C:
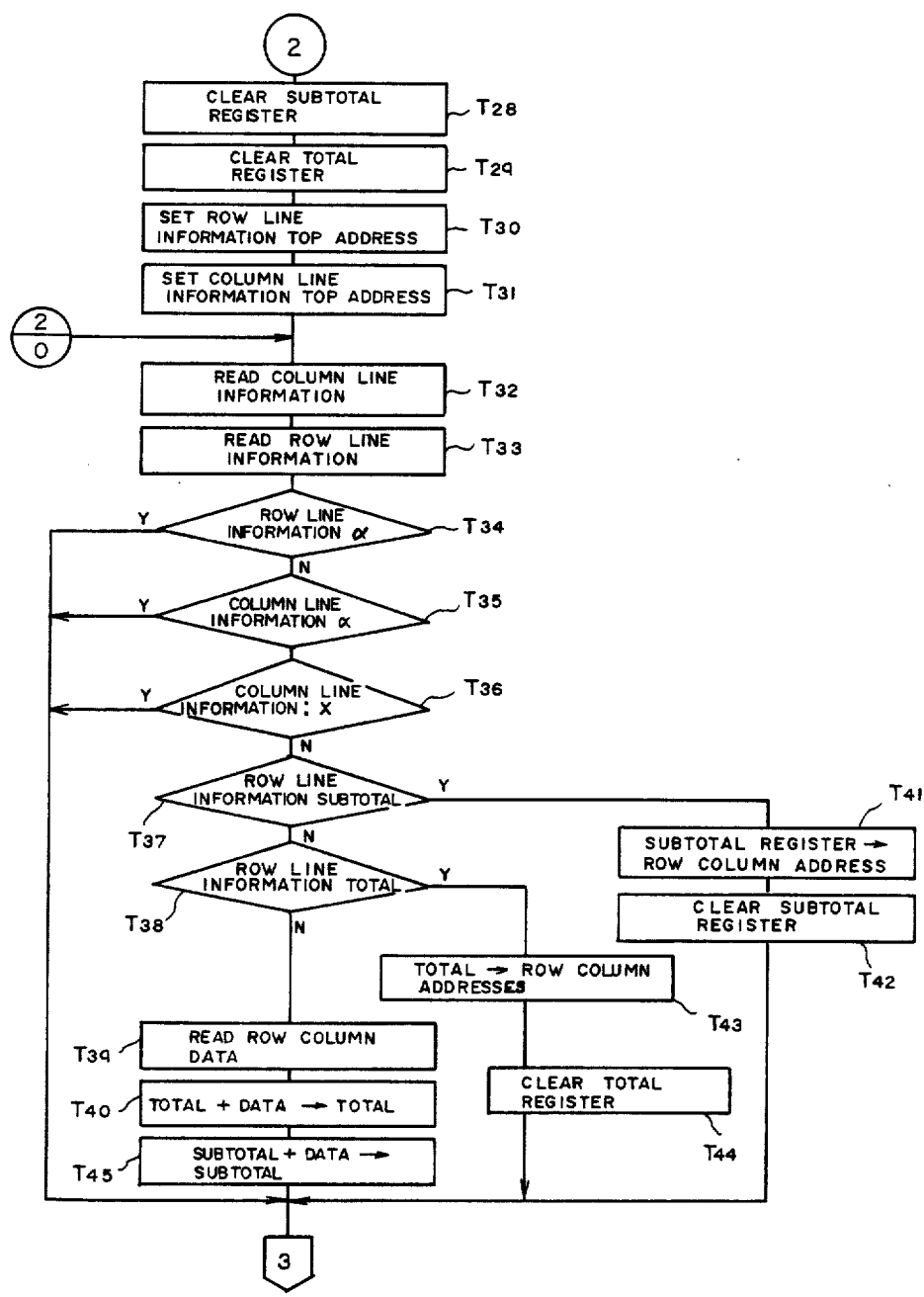
Figure 8D:
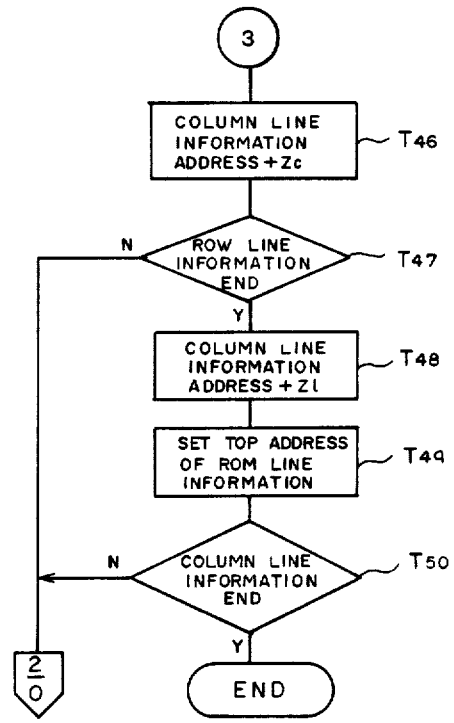

Upon starting as shown in START of FIG. 8A, the processing is first executed in single row unit. The portion is initialized. The subtotal register STR and grand total register GTR are respectively cleared ($T_1$, $T_2$) The clearing steps ($T_1$, $T_2$) of the registers are the initialization for performing the totalization in a single row unit anew. Further, the top address of the row information and that of the column information are set ($T_3$, $T_4$). The setting steps ($T_3$, $T_4$) of these top addresses are the setting of the top addresses in which input data to be processed henceforth. The initialization ends upon the clearing ($T_1$, $T_2$) of the registers and the setting ($T_3$, $T_4$) of the top addresses.

Next, the processing of subtotals and a grand total is performed. Row line information are read ($T_5$), and whether the row line information is character data $\alpha$, subtotal data ST or grand total data GT is decided ($T_6$, $T_7$, $T_8$). If any of these deciding steps ($T_6$, $T_7$, $T_8$) affords coincidence (Y), the run is moved to a processing terminal $\bigcirc$. When all afford noncoincidence (N), that is, when the row line information is data, column information is subsequently read ($T_9$). Even when the decision result of the preceding processing was the data, no addition is needed if the column line information is character data $\alpha$. Therefore, it is decided ($T_{10}$) if the column information is the character data $\alpha$. In the case (Y) of coincidence, the run is moved to the processing terminal $\bigcirc$. In the case (N) of noncoincidence, the column line information is any of data, a multiplication, a subtotal and a grand total, and hence, they are discriminated so as to perform the corresponding processing. More specifically, at first, the column line data discriminates ($T_{11}$) whether it is a multiplication. In the case (Y) of the multiplication, it is discriminated ($T_{12}$) whether the preceding and following portions, namely, LADR+1 and LADR−1 of the present column address LADR are a region for the item data. If they are outside the region, the error processing (ERJOB) is executed, as it means an error (ERR). If they are within the region, it means a normal state (OK). Thus, the content of the item register KMG designated by the address LADR−1 immediately preceding the present column address LADR is multiplied by the content of the item register KMG designated by the present column address LADR, thereby storing ($T_{13}$) the product in the item register KMG designated by the address (LADR+1) immediately following the present column address. If in the aforementioned discrimination ($T_{11}$) of the multiplication, it is discriminated (N) not to be a multiplication, the process is started from the terminal $\bigcirc$. Namely, it is discriminated ($T_{14}$) whether the column line information is a subtotal. When the column line information is decided (Y) to be the subtotal, the content of the subtotal register STR is stored ($T_{15}$) in the position of the memory appointed by the row and column addresses, whereupon the subtotal register STR is cleared ($T_{22}$). In the case (N) where the column information is not the subtotal, that is, the decision ($T_{14}$) affords noncoincidence (N), it is decided ($T_{16}$) if the column information is the grand total. In the case (Y) of coincidence, namely, the grand total, the content of the grand total register is stored ($T_{17}$) in the position of the register appointed by the row and column addresses, whereupon the grand total register is cleared ($T_{18}$). In the case (N) where the grand total decision ($T_{16}$) of the column information is noncoincidence, that is, where it is data, the content of the position of the register appointed by the row and column addresses is read out ($T_{19}$) and then added to the content of the grand total register GT, and the result is stored ($T_{20}$) in the grand total register GT. Further, in the same manner, the position of the register appointed by the row and column addresses is read out and the content is added to the content of the subtotal register ST, and the result is stored ($T_{21}$) in the subtotal register ST.

By the execution conducted after the process $T_{18}$, $T_{21}$, $T_{22}$ is executed, and the execution from the terminal $\bigcirc$, a column data address constant $Z_l$ is added ($T_{23}$) to the column information address. The "column data address constant" is a constant indicative of that address change of the assigned item data which corresponds to the next column in the identical row. For example, when the register position in which item data "10" in the left upper part of FIG. 1 is stored has been appointed by the row information address and column information address, the register position in which the right item data "8" is stored is appointed after the addition ($T_{23}$) of the column data address constant $Z_l$ to the column information address.

Next, it is decided ($T_{24}$) if the column information ends. That is, whether or not the row direction processing of one row has ended is decided. In the case (N) where the processing has not ended, the flow returns from a terminal

to a terminal

so as to run the processing from the row information reading step ($T_5$) again. In the case (Y) where it has ended, a row data address constant $Z_c$ is added ($T_{25}$) to the row information address, and further, the column information top address is set ($T_{26}$). Owing to these processing steps ($T_{25}$, $T_{26}$), the head column of the next row is appointed by the row and column line information addresses. Subsequently, it is decided ($T_{27}$) if the row information end. That is, it is decided if the processing in the respective row directions has entirely ended. In the case (N) where it has not ended, the above operations are repeated again. In the case (Y) of the end, the run is started from a terminal $\bigcirc$.

The processing from the terminal $\bigcirc$ is totalization in the column direction, and is substantially the same as the above-stated processing in the row direction. Since subtotals and totals in the column direction were not found yet, the totalization in the row direction was executed except subtotal and grand total rows. Since the processing for the column direction has previously been executed, the totalization in the column direction is not performed only in a case where the row line information and column line information are character data, and it is performed likewise to the above in the other cases. The subtotal and grand total registers are cleared ($T_{28}$, $T_{29}$), and the row and column line information top addresses are set ($T_{30}$, $T_{31}$). These operations are the same as the initialization ($T_1$-$T_4$) for the row direction. Next, column information and row line information are read out ($T_{32}$, $T_{33}$), whether or not they are character data is decided ($T_{34}$, $T_{35}$), and whether or not the column line information is a multiplication is decided ($T_{36}$).

In the case where neither is the character data, the multiplication data, the subtotal and grand total of the row information are decided ($T_{37}$, $T_{38}$). As the subtotal and grand total of a multiplier do not have any meaning, they are omitted from this flow chart. In the case where the row line information is neither the subtotal data nor the grand total data, the content of the register position appointed by the row and column addresses is read out ($T_{39}$) and is added to the content of the grand total register, and the result is stored in the grand total register ($T_{40}$). Further, the stored result is added to the content of the subtotal register, and the result is stored in the subtotal register ($T_{45}$). When the row information is the subtotal data, the content of the subtotal register is stored ($T_{41}$) in the position of the item register appointed by the row and column addresses, whereupon the subtotal register is cleared ($T_{42}$). When the row information is the grand total data, the content of the grand total register is stored ($T_{43}$) in the position of the item register appointed by the row and column addresses, whereupon the grand total register is cleared ($T_{44}$).

Since these processing steps are executed in single column unit, the row data address constant $Z_c$ is added ($T_{46}$) to the row information address, and whether or not one column has ended is decided ($T_{47}$) by the use of the row information address. In the case where it has not ended, the run shifts from a terminal

to a terminal $\frac{2}{0}$ so as to start from the column information reading step ($T_{32}$) again. In the case where the processing of one column has ended, the column address constant $Z_l$ is added to the column information address ($T_{44}$), and the row information top address is set ($T_{49}$). Further, whether or not the processing in the column direction has ended is decided ($T_{50}$). In the case (N) where it has not ended, the run starts from the terminal $\frac{2}{0}$ again. In the case (Y) where it has ended, it is deemed that the entire totalization has ended, and the run of this processing ends. Owing to the operations thus far described, the multiplication data and the subtotal and grand total data are displayed in the appointed positions.

Figure 9:
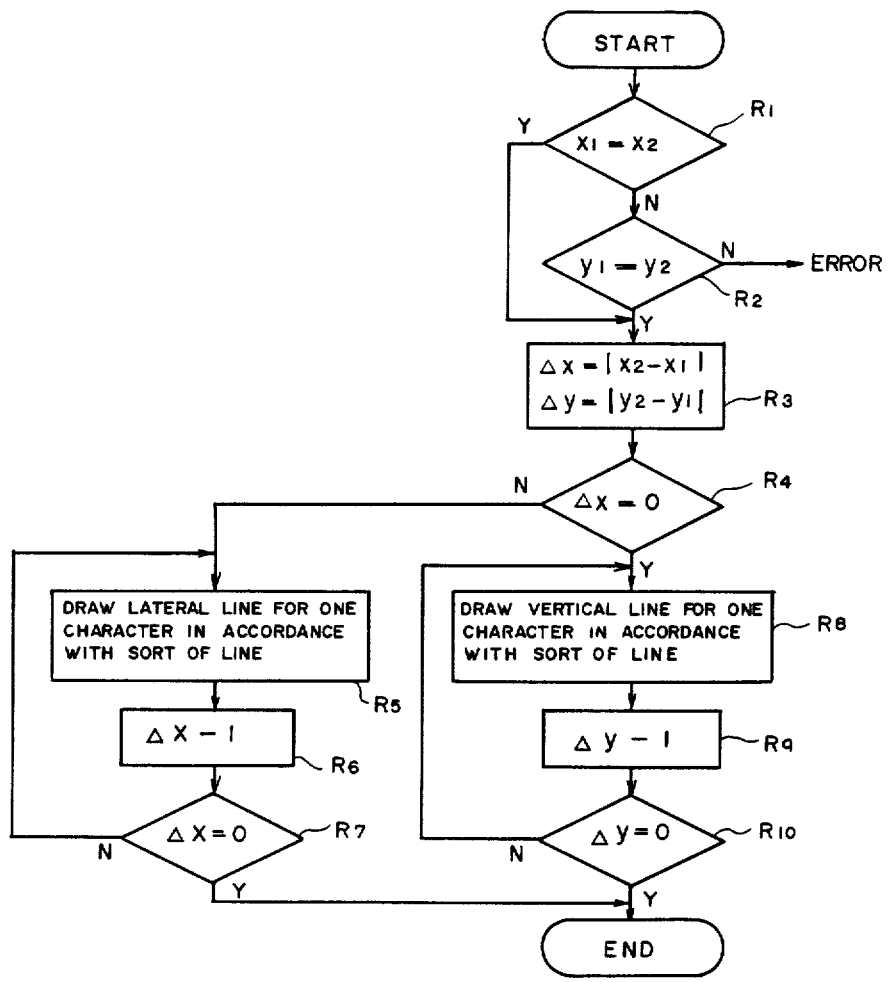

FIG. 9 is a processing flow diagram in the ruled line drawing-up and discriminating units KST and KSP, and shows the processing step $S_6$ in FIG. 5 in detail. The processing generates data to be displayed on the display unit CRT, on the basis of the data of the sort, start point and end point of the inputted line. First, it is decided ($R_1$) whether or not the x-axis coordinate of the input is coincident. In the case (Y) of coincidence, the processing ($R_3$) of finding the variation between the points is executed. In the case (N) of noncoincidence, whether or not the y-axis coordinate is coincident is decided ($R_2$). When this deciding step affords noncoincidence, another processing is executed by regarding the input as an error. In the case (Y) of coincidence, the processing ($R_3$) is executed. These two decision processing steps ($R_1$, $R_2$) discriminate if a segment connecting the inputted start and end points inclines relative to the x-axis or y-axis. In the case where the segment does not incline, that is, where it is parallel to the x-axis or y-axis, the x-coordinate values or y-coordinate values of the respective points are equal. This condition is utilized in the processing. When the x- or y-coordinate values are coincident, the processing ($R_3$) is performed as stated above. The processing ($R_3$) is the processing of finding the interval between the inputted start and end points. That is, it evaluates the variations $\Delta x$ and $\Delta y$ of the x- and y-coordinates ($\Delta x = |x_2 - x_1|$, $\Delta y = |y_2 - y_1|$). Here, ($x_1$, $y_1$) and ($x_2$, $y_2$) are the coordinates of the start point and the end point respectively.

Next, whether or not the variation $\Delta x$ of the x-coordinate is zero is decided ($R_4$). This decision is the processing of finding whether the segment is parallel to the x-axis or to the y-axis. In the case (N) where $\Delta x$ is not zero, a lateral line corresponding to one character is obtained ($R_5$) in accordance with the sort of the inputted line, and it is displayed on the display unit. The display is effected automatically by writing data into the display memory HM. Thereafter, a value corresponding to one character is subtracted ($R_6$) from the value of $\Delta x$. That is, the value of $\Delta x$ is decremented. Next, whether or not $\Delta x$ is zero is decided ($R_7$). When it is not zero (N), the processing ($R_5$) is performed again and is repeated in succession until the value of $\Delta x$ becomes zero. The above operations are processing in the case of depicting the segment in the direction of the axis of abscissas, namely, the x-axis.

In the case (Y) where the decision ($R_4$) affords zero, the processing step of depicting a segment in the y-axial direction is performed. Likewise to the processing in the x-axial direction, a vertical line corresponding to one character is drawn ($R_8$) in accordance with the sort of the line. $\Delta y$ is decremented ($R_9$), and whether or not the resulting value is zero is decided ($R_{10}$). In the case where it is not zero, the processing ($R_8$) is executed again. The above processing is repeated until $\Delta y$ becomes zero.

When the above operations have ended (END), the straight line in the x-axial or y-axial direction is drawn on the display unit. In other words, the start and end points are connected by the appointed segment.

Figure 10:
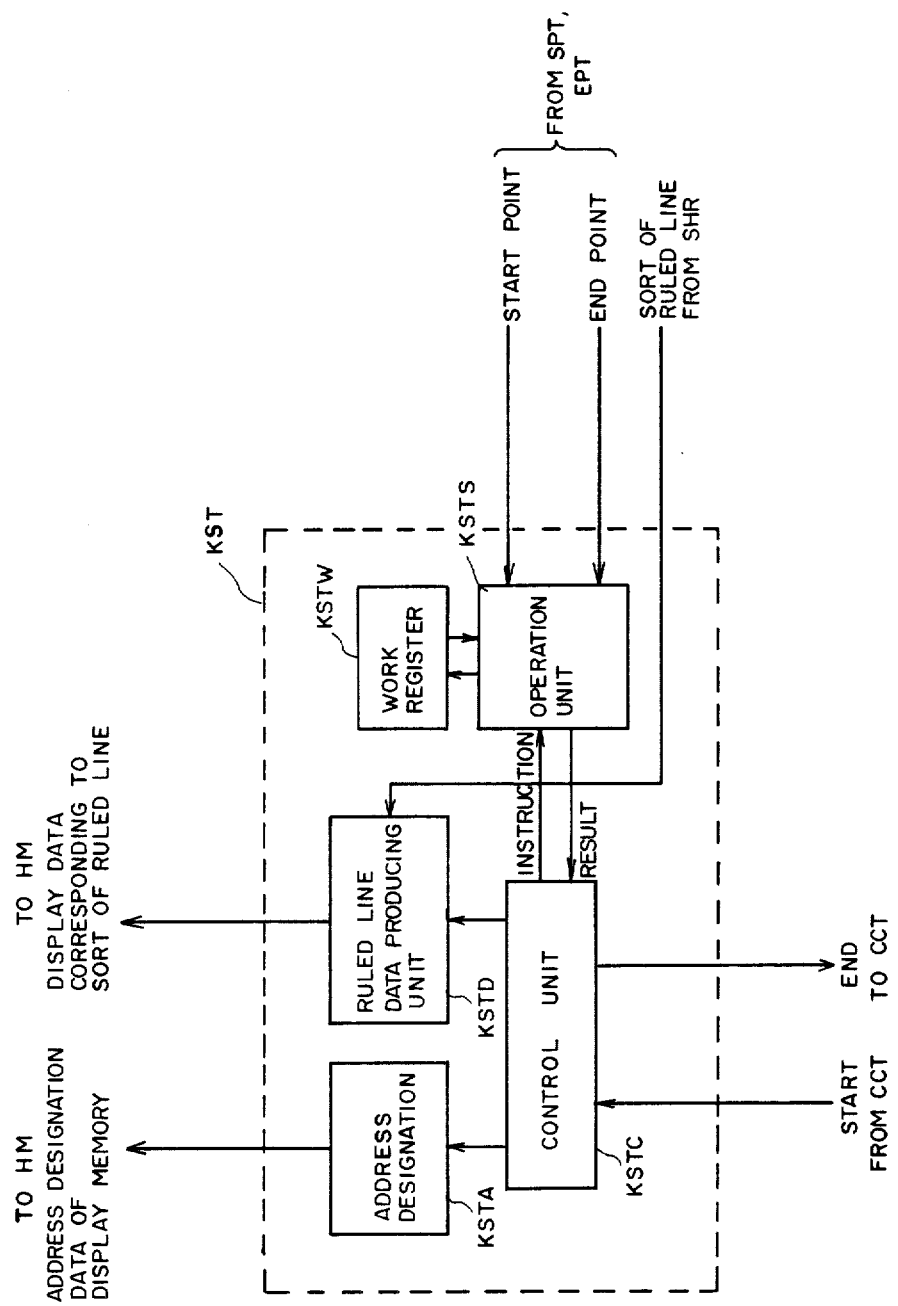
FIG. 10 is a detailed block diagram of a ruled line drawing-up unit.

FIG. 10 is a block diagram of the ruled line drawing-up unit KST. The start point pointer SPT and end point pointer EPT supply an arithmetic unit KSTS with addresses which are stored in the respective pointers. Although a single input line for each address is shown, actually each address is inputted by a plurality of lines. In response to a command from a control unit KSTC, the arithmetic unit KSTS evaluates the variations of the x- and y-coordinates by utilizing a work register KSTW. Further, it generates the address information of the ruled line to be displayed. The result is inputted to an addressing unit KSTA through the control unit KSTC. The addressing unit KSTA generates the address of the display memory HM corresponding to a screen, on the basis of the address information of the ruled line to be displayed, and it delivers the address to the display memory HM.

On the other hand, the sort data of the ruled line from the sort register SHR is applied to a ruled data generating unit KSTD, which converts it into data to be written into the display memory. The conversion generates data in single character unit. The operations of the addressing unit KSTA and ruled data generating unit KSTD are all controlled by control signals from the control unit KSTC. Further, the controls of the various units by the control unit KSTC are started by the one-line generation start signal of the control unit CCT. Upon the end of the generation of one line, the control unit CCT is supplied with an end signal from the control unit KSTC. At this time, the ruled line information is also transmitted to the control unit CCT, which then secures the area of the item register KMG. While FIG. 10 is the block diagram of the ruled line drawing-up unit KST, a program in the ruled line drawing-up unit KSP in the apparatus of FIG. 4 employing the processor CPU executes similar operations.

Figure 11:
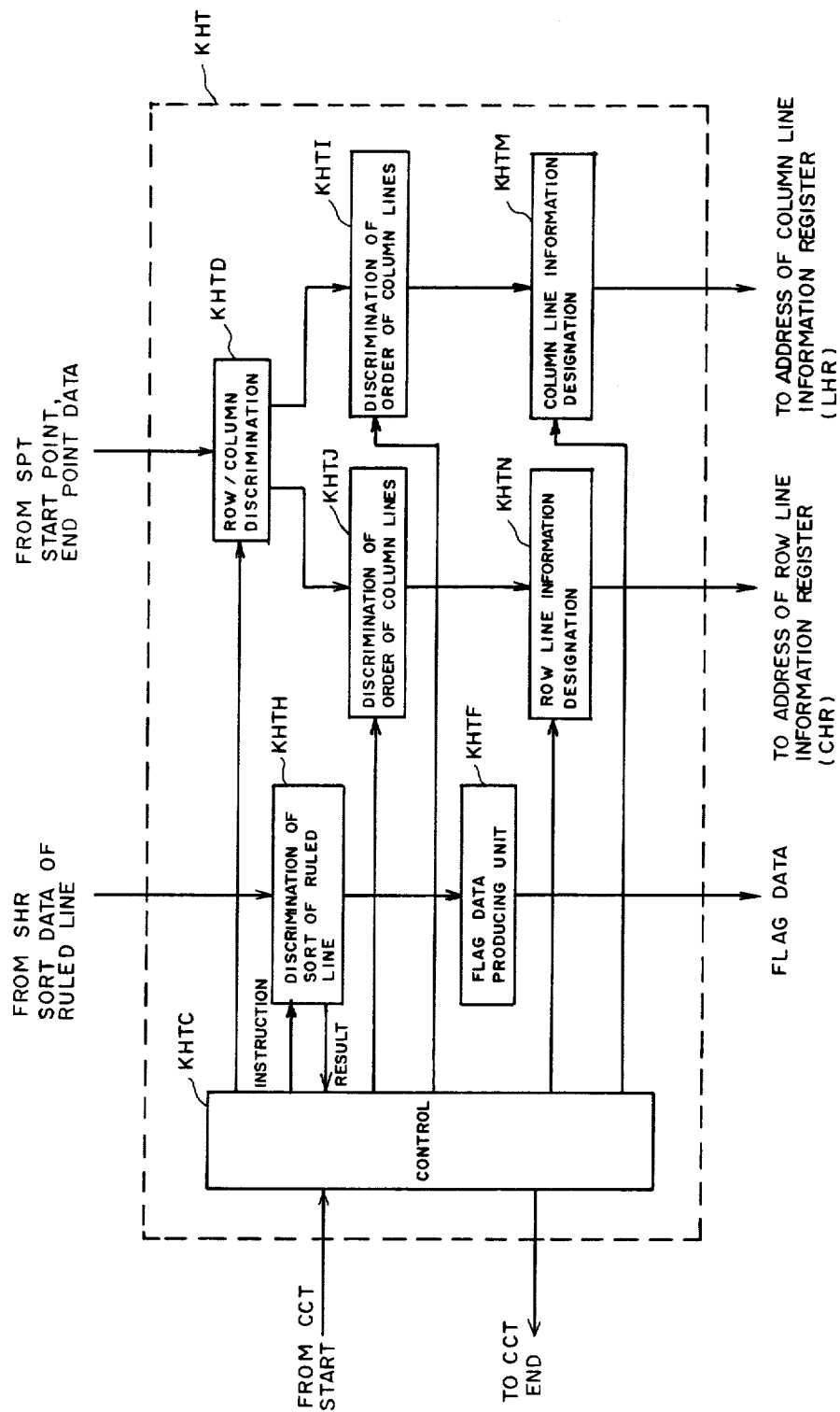
FIG. 11 is a detailed block diagram of a ruled line discriminating unit.

FIG. 11 is a block diagram in which the ruled line discriminating unit KHT is illustrated more in detail.

Upon receiving a start signal from the control unit CCT, a control unit KHTC controls a ruled line sort discriminating unit KHTH, a row/column discriminating unit KHTD, a row line level discriminating unit KHTJ, a column line level discriminating unit KHTI, a row line information area appointing unit KHTN, and a column line information area appointing unit KHTM, so as to generate row line information and column line information. First, at the same time that the start signal from the control unit CCT has been received, the control unit KHTC delivers a discrimination command to the ruled line sort discriminating unit KHTH. Thus, the ruled line sort discriminating unit KHTH falls into the discriminating operation of discriminating the ruled line sort data inputted from the sort register SHR. The result is outputted to a flag data generating unit KHTF. On the basis of the received result, the flag data generating unit KHTF produces coded data to be stored in the row line information register CHR and column line information register LHR. The generated coded data are stored in the respective registers CHR and LHR. At this time, the coded data are stored in the addresses of the register CHR and LHR appointed by the row line information address and column line information address which have been generated by the operations of the row/column discriminating unit KHTD, row line level discriminating unit KHTJ, column line level discriminating unit KHTI, row line information area appointing unit KHTN and column line information area appointing unit KHTM.

More specifically, first of all, whether the ruled line is a row line or a column line is discriminated by the row/column discriminating unit KHTD from the start and end point data respectively fed from the start point pointer SPT and end point pointer EPT. The start point and end point data are delivered to the level discriminating units in the corresponding directions, that is, the row line is sent to the row line level discriminating unit KHTJ and the column line to the column line level discriminiting unit KHTI. The row line (column line) discriminating unit KHTJ (KHTI) discriminates the level of the row line (column line) in response to the control signal of the control unit KHTC. It compares the inputted data with the respective ruled line positions currently stored, to evaluate which position the inputted ruled data corresponds to in the order of the ruled line position data currently stored. The data of the order, namely, the level data is delivered to the row line (column line) information area appointing unit KHTN (KHTM).

In response to the control signal of the control unit KHTC, the row line (column line) information area appointing unit provides the corresponding address of the row line (column line) information register CHR (LHR) on the basis of the inputted level data. Thus, the position of the row line (column line) information register CHR (LHR) is specified, and the output data of the flag data generating unit is stored in the specified position. At the same time that the aforementioned data have been stored, the control unit KHTC delivers an end signal to the control unit CCT.

In the above, the present invention has been described in detail in conjunction with the embodiments.

While, in the embodiments of the present invention, the ruled line corresponding to the subtotal or grand total has been the double straight line, it may well be another line, for example, a dotted line or a broken line. In addition, the demarcation line of the subtotal and that of the grand total may be different ruled lines. This is also the case with regard to a multiplication.

In the above embodiment, the multiplication is performed only in the lateral direction but it is clear that the multiplication is possible in the vertical direction. In this case, the multiplication process is needed in the vertical direction. Besides the multiplication, it is clear that any kind of calculation such as a subtraction, division, and a percentage calculation can be conducted quite easily in accordance with the present invention.

Further, while in the embodiments of the present invention the addresses of the start point and end point have been appointed by the use of the light pen, it is also possible to input them from the key input unit.

As set forth above, according to the present invention, the totalizing method is inputted simultaneously with the tabulation. Therefore, various data given in the shape of a matrix can be simply totalized.

Furthermore, since no difficult program needs to be prepared, anybody can perform the totalizing processing. Besides, according to the present invention, the subtotal area, grand total area and multiplication area of a table prepared "in consequence" are demarcated by the specified lines such as double straight lines or other two lines, so that the table is very easy to see.

What is claimed is:

1. In an apparatus for calculating tablulated item data in at least one of laterial and vertical directions in a matrix table,
    a tabulated item data calculating apparatus comprising: discrimination means for discriminating a type of a ruled line which demarcates the tabulated item data in said matrix table;
    calculation means for calculating the tabulated item data in at least one of the lateral and vertical directions of said matrix table on the basis of information produced by said discrimination means, to thereby produce calculated tabulated data; and
    output means for delivering the calculated tabulated data obtained by said calculation means to a predetermined position in said matrix table.

2. The tabulated data calculating appartus of claim 1, including a display, and wherein said discrimination means includes means for discriminating the type of said ruled line as a function of colors in said display.

3. The tabulated data calculating apparatus of claim 1, including a display, and wherein said discrimination means includes means for discriminating the type of said ruled line as a function of shapes in said display.

4. The tabulated data calculating apparatus of claim 1, wherein said calculation means includes means for accumulating the tabulated data in the lateral direction of said matrix table.

5. The tabulated data calculating apparatus of claim 1, wherein said calculation means includes means for accumulating the tabulated data in the vertical direction of said matrix table.

6. The tabulated data calculating apparatus of claim 1, wherein said calculation means includes means for multiplying the tabulated data in the lateral direction.

7. The tabulated data calculating apparatus of claim 1, wherein said calculation means includes means for multiplying the tabulated data in the vertical direction of said matrix table.

8. In an apparatus for calculating tabulated item data in at least one of lateral and vertical directions, a tabulated data calculating apparatus comprising:
ruled line generating means for drawing a ruled line which demarcates the tabulated item data;
determination means for determining a type of the ruled line drawn by said ruled line generating means; and
calculation means for calculating the tabulated item data in at least one of said lateral and vertical directions on the basis of information produced by said determination means;

9. The tabulated data calculating apparatus of claim 8, wherein said ruled line generating means includes means for generating said ruled line in a plurality of colors; and said discrimination means includes means for discriminating the color of the ruled line to be displayed.

10. The tabulated data calculating apparatus of claim 8, wherein said ruled line generating means includes means for generating said ruled line in a plurality of shapes; and said discrimination means includes means for discriminating the shape of the ruled line to be displayed.

11. The tabulated data calculating apparatus of claim 8, wherein said calculation means includes means for accumulation in at least one of said lateral and vertical directions.

12. The tabulated data calculating apparatus of claim 8, wherein said calculation means includes means for multiplying in at least one of said lateral and vertical directions.

13. The tabulated data calculating apparatus of claim 8, wherein said ruled line generating means includes a light pen for drawing said ruled line on the basis of positional information produced by said light pen.

14. In an apparatus for calculating tabulated item data in at least one of lateral and vertical directions,
a tabulated item data calculating apparatus comprising: ruled line generating means for drawing a ruled line which demarcates the tabulated item data;
discrimination means for discriminating a type of the ruled line drawn by said ruled-line generating means;
calculation means for calculating the tabulated item data in at least one of said lateral and vertical directions on the basis of information produced by said discrimination means to thereby produce calculated tabulated data; and
a keyboard coupled to said ruled line generating means for inputting at least one of the type and position of the ruled line to said ruled line generating means.

15. In an apparatus for totalizing tabulated item data in at least one of lateral and vertical directions,
a tabulated data calculating data calculating apparatus comprising:
ruled line generating means for drawing a ruled line which demarcates the tabulated data;
first discrimination means for discriminating whether or not said line drawn by said ruled line generating means is a specified line;
second discrimination means for discriminating whether or not specified lines have been successively drawn when said first discrimination means has discriminated said specified line; and
calculation means for calculating a subtotal totalizing a small portion of the tabulated item data in at least one of said lateral and vertical directions on the basis of information produced by said first discrimination means, and for also calculating a grand total totalizing the subtotal of the tabulated item data in at least one of said lateral and vertical directions on the basis of information produced by said second discrimination means.

16. The tabulated data totalizing apparatus of claim 15, including a display, and wherein said first discriminating means includes means for discriminating the type of said ruled line as a function of colors in said display.

17. The tabulated data totalizing apparatus of claim 15, including a display, and wherein said first discrimination means for discriminating the type of the ruled line as a function of shapes in said display.

18. The tabulated data totalizing apparatus of claim 15, including a display, and wherein said ruled line generating means includes means for drawing at least a single straight ruled line and a double straight ruled line in said display, and said first and second discrimination means includes means for discriminating said double straight ruled line in said display.

19. In an apparatus for calculating tabulated item data in at least one of lateral and vertical directions,
a tabulated data totalizing apparatus comprising:
discrimination means for discriminating a specified type of a ruled line which demarcates the tabulated item data;
multiplication means for enabling preceding data demarcated by a ruled line of said specified type and another ruled line to be multiplied by data immediately preceding said preceding data when said discrimination means has discriminated said specified type of ruled line; and
output means for delivering an output of said multiplication means to a position immediately after said specified ruled line.

20. The tabulated data totalizing apparatus of claim 19, including a display, and wherein said discrimination means includes means for discriminating the type of said ruled line as a function of colors in said display.

21. The tabulated data totalizing apparatus of claim 19 including a display, and wherein said discrimination means includes means for discriminating the type of said ruled line as a function of shapes in said display.

22. The tabulated data totalizing apparatus of claim 21, wherein the shapes of said ruled lines in said display are parallel lines of a straight line and a dot-and-dash line.

23. In an apparatus for calculating tabulated item data, a tabulated data calculating apparatus comprising:
  discrimination means for discriminating a type of a ruled line which demarcates the tabulated item data; and
  calculation means for calculating the tabulated item data on the basis of information produced by said discrimination means to thereby produce the calculated tabulated data.

24. In an apparatus for calculating tabulated item data,
  a tabulated data calculating apparatus comprising:
  discrimination means for discriminating a type of a ruled line which demarcates the tabulated item data;
  calculation means for calculating the tabulated item data on the basis of information produced by said discrimination means; and
  means for delivering the calculated tabulated data obtained by said calculation means to a predetermined position relative to said tabulated item data.

* * * * *